ROD WORTH MINIMIZER

Filed May 16, 1966 8 Sheets-Sheet 1

Fig I

INVENTORS:
George A. Roupe
Gerald R. Parkos
Geza L. Gyorey
Russell L. Crowther
Orville A. Thompson Charles D B Curry INVENTORS:
George A. Roupe
Gerald R. Parkos
Geza L. Gyorey
Russell L. Crowther
Orville A. Thompson Charles D B Curry

STARTING ARRAYS FOR CENTER ROD OUT

STARTING ARRAYS FOR CENTER ROD IN

NETWORK I AND GROUP 1

NETWORK II AND GROUP 2

INVENTORS:
George A. Roupe
Gerald R. Parkos
Geza L. Gyorey
Russell L. Crowther
Orville A. Thompson BY Charles D B Curry

GROUP 3A (FROM GROUP 1)

GROUP 3B (FROM GROUP 1)

GROUP 4A (FROM GROUPS 1&3A)

GROUP 4B (FROM GROUPS 1&3B)

INVENTORS:
George A. Roupe
Gerald R. Parkos
Geza L. Gyorey
Russell L. Crowther
BY Orville A. Thompson
Charles D B Curry

GROUP 3C (FROM GROUP 2)

GROUP 3D (FROM GROUP 2)

GROUP 4C (FROM GROUPS 2 & 3A)

GROUP 4D (FROM GROUPS 2 & 3B)

INVENTORS:
George A. Roupe
Gerald R. Parkos
Geza L. Gyorey
Russell L. Crowther
Orville A. Thompson
BY Charles D B Curry

SEQUENCE A (CENTER-ROD-IN)

GROUP 1
GROUP 2
GROUP 3A or 3C
GROUP 4A or 4C

SEQUENCE B (CENTER-ROD-OUT)

GROUP 1
GROUP 2
GROUP 3B or 3D
GROUP 4B or 4D

INVENTORS:
George A. Roupe
Gerald R. Parkos
Geza L. Gyorey
Russell L. Crowther
Orville A. Thompson
BY Charles D B Curry

SEQUENCE A-POWER OPERATION PATTERNS(CENTER-ROD-IN)

73% WITHDRAWN
AFTER GROUP 5
WITHDRAWN

SEQUENCE B-POWER OPERATION PATTERNS(CENTER-ROD-OUT)

71% WITHDRAWN
AFTER GROUP 5
WITHDRAWN

INVENTORS:
George A. Roupe
Gerald R. Parkos
Geza L. Gyorey
Russell L. Crowther
Orville A. Thompson
BY Charles P.B. Curry (CENTER-ROD-IN)SEQUENCE A-1

(CENTER-ROD-IN)SEQUENCE A-2

(CENTER-ROD-OUT)SEQUENCE B-1

(CENTER-ROD-OUT)SEQUENCE B-2

INVENTORS:
George A. Roupe
Gerald R. Parkos
Geza L. Gyorey
Russell L. Growther
Orville A. Thompson
BY
Charles D B Curry United States Patent Office 3,385,758
Patented May 28, 1968

3,385,758

ROD WORTH MINIMIZER

Geza L. Gyorey, Gerald R. Parkos, George A. Roupe, Orville Andrew Thompson, San Jose, and Russell Lee Crowther, Saratoga, Calif., assignors to General Electric Company, a corporation of New York Filed May 16, 1966, Ser. No. 550,207
6 Claims. (Cl. 176—33)

ABSTRACT OF THE DISCLOSURE

This describes a method of operating the control rods of a nuclear reactor core to minimize individual control rod worth. The control rods are withdrawn as a sequence of groups of substantially evenly dispersed control rods to leave a checkerboard pattern of control rods remaining at least partially inserted in the core. Advantageously the rods are periodically swapped by inserting the rods that have been withdrawn and withdrawing the rods that have been inserted.

The present invention relates broadly to an improvement in nuclear fission reactors and more particularly to a unique method of operating such nuclear fission reactors.

The release of large amounts of energy through nuclear fission reactions is now quite well known. In general, a fissile (fissionable) atom such as $U^{233}$, $U^{235}$, $Pu^{239}$, or $Pu^{241}$ absorbs a neutron in its nucleus and undergoes a nuclear disintegration. This produces on the average two fission products of lower atomic weight with great kinetic energy, and several neutrons also of high energy. For example, the fission of $U^{235}$ produces a light fission product and a heavy fission product with atomic mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If, in addition to parasitic absorption and other losses of neutrons from the system, there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissile material exists in the fuel to override the effects of the fission products and other neutron absorbers such as fission regulating control rods which also may be present.

In order to maintain such fission reactions at a rate sufficient to generate useful quantities of thermal energy, nuclear reactors are presently being designed, constructed, and operated in which the fissile material (nuclear fuel) is contained in the fuel elements which may have various shapes, such as plates, tubes or rods. For convenience, these fuel elements will hereinafter be referred to as fuel rods. These fuel rods are usually provided on their external surface with a corrosion-resistant non-reactive cladding which contains no fissile or fertile material. The fuel rods are grouped together at fixed distances from each other in a coolant flow channel or region as a fuel bundle, and a sufficient number of these fuel bundles are combined to form the nuclear reactor core capable of the self-sustained fission reaction referred to above. A reactivity control system is provided which consists of a plurality of neutron absorbing control rods movably disposed in the reactor core for controlling the reactivity of the nuclear fuel in the core. These control rods are withdrawn from or inserted into the core to absorb respectively a lesser or greater number of neutrons and thereby vary the reactivity of the fuel in the core.

To achieve the desired efficiency and safety objectives the maximum reactivity worth of the control rods and the rates with which the control rods can be inserted or withdrawn are held to values such that no single mechanical or electrical control system malfunction could cause a reactivity transient capable of damaging the reactor system or cause significant fuel failure. The damage level may be defined in terms of fuel energy density, for example, calories/gram of $UO_2$. The probability of mechanical damage to the reactor system increases as the peak energy density approaches 425 cal./gm. ($UO_2$ vaporization) and drops to essentially zero as the peak energy density approaches 220 cal./gm. ($UO_2$ melting). Although it is unlikely that extensive damage to the system would occur with a peak energy density of 425 cal./gm., it is generally desirable to operate the reactor in such a manner as to prevent reactivity insertions (control rod withdrawals) resulting in peak energy densities in excess of about 200 cal./gm. The peak energy density of the fuel occurring during such a reactivity insertion is primarily determined by the two parameters (1) control rod worth (the neutron absorption effectiveness of the control rod) and (2) control rod velocity.

Although the control rod velocity limiting means, the second of these two parameters, is not part of the present invention, it affects the fuel peak energy density and is discussed in copending patent applications of T. Trocki, Ser. No. 503,267, filed Oct. 23, 1965, of E. E. Olich et al., Ser. No. 504,048, filed Oct. 23, 1965, and of R. L. Hughes et al., Ser No. 487,438, filed Sept. 15, 1965. The design of the control rod driving mechanism also provides for low control rod withdrawal velocities, the details of which are shown and described in U.S. Patent No. 3,020,887 issued to R. R. Hobson, Feb. 13, 1962.

The present invention involves a method of operating a reactor whereby the reactivity worth of any individual control rod remaining in the reactor core is kept at a minimum value. This control rod reactivity worth is largely dependent upon the relative positions of the control rods in the reactor core. Although the reactivity control system for nuclear reactors is highly reliable and operator action cannot initiate a serious nuclear excursion, operator action can increase the control rod worth by forming undesirable control rod patterns. Such a pattern is the positioning of the control rods of a given group relative to each other so that one or more rods in the group has an unusually high reactivity worth. Control rod patterns which have relatively low individual rod worths generally result in the reactor having higher efficiency, as well as having a safer system. Therefore, it is desirable to operate a reactor such that the control rod patterns used will provide minimum control rod worth. This may be accomplished by withdrawing and inserting control rods in accordance with the preselected sequences of the present invention. This may be achieved by manual operator selection, by automatic selection, or by prohibiting movement of rods incorrectly selected by the operator. A digital machine can be used to withdraw or insert the control rods automatically in this preselected sequence. Alternatively, a digital machine may monitor the selections of the operator to assure compliance with an accepted procedure involving the preselected sequences and patterns. In the latter situation, when the selections of the operator deviate from the accepted procedure in such a fashion as to develop a potentially high rod worth configuration, the digital machine will block further rod movement until there is operator selection according to the accepted procedure.

It should be recognized that there exist many possible control rod withdrawal and insertion patterns and sequences for controlling nuclear reactors. However, the present invention is based on unique patterns and pattern sequences that have been found particularly advantageous for the control of nuclear reactors. The reactor is operated in accordance with the control rod patterns and sequences of the present invention from fully shutdown to rated power and from rated power to fully shutdown. The patterns and sequences may be used for both control rod insertion and withdrawal. However, for ease of description the generally described mode of operation will be that of control rod withdrawal.

The two basic sequences of the present invention will be hereinafter referred to as Sequence A and Sequence B. Each of these sequences results in a checkerboard pattern in which Sequence A has the center control rod of the reactor core inserted when 50% of the control rods have been fully withdrawn and in which Sequence B has the center control rod of the reactor core withdrawn when 50% of the control rods have been fully withdrawn. It is not desirable to operate the reactor for long periods of power operation with a given control rod pattern since this results in nonuniform fuel depletion. Therefore, periodic changes, for example, every two months, in patterns can achieve a more uniform fuel depletion across the core. The two basic sequences (A and B) and the resultant checkerboard pattern of the present invention are particularly well suited for pattern changing which involves switching the position of control rods. This change in patterns will be referred to as "rod swap" and is generally accomplished at reduced power levels and may involve an exchange of control rods between the two basic sequences.

Each of the two sequences (A and B) are formed by the sequential withdrawal of four basic groups of control rods which will be referred to as Group 1, Group 2, Group 3 and Group 4. These control rod groups are withdrawn in sequence and all of the control rods in each group are completely (with some infrequent exceptions) withdrawn prior to proceeding to the next group.

The particular positions of these four basic groups of control rods in the reactor core are derived from two geometric networks which will be referred to as network I and network II. Each of these networks is composed of a plurality of overlapping 3 x 3 square arrays of control rods, and each array thus includes nine control rods.

Network I comprises a plurality of 3 x 3 arrays formed in the reactor core such that the control rod in each of the corner positions of each array is common with the control rod in the corner position of a diagonally adjacent 3 x 3 array.

Network II comprises a plurality of 3 x 3 arrays formed in the reactor core such that adjacent pairs of control rods in the corner positions of each array are common with adjacent pairs of control rods in the corner positions of adjacent arrays of network I.

Group 1 consists of all the control rods in the center positions of the 3 x 3 arrays of network I. Group 2 consists of all of the control rods in the center positions of the 3 x 3 arrays of network II. Group 3 consists of all of the corner control rods positioned along selected diagonals in the 3 x 3 arrays of either network I or network II. These diagonals, when extended beyond their arrays, are either common with or parallel to the other selected diagonals. Group 4 consists of the remaining corner control rods in the 3 x 3 arrays of the same network. These remaining corner control rods lie along diagonals bearing a perpendicular relation to the selected diagonals.

The withdrawal or insertion sequence may be Groups 1, 2, 3, and 4 or Groups 4, 3, 2, and 1. In addition, the Group 1 and 2 sequences may be exchanged and the Group 3 and 4 sequences may be exchanged. This then provides a total of eight possible withdrawal sequences and eight possible insertion sequences. However, minimum rod worth patterns cannot be assured if there is an exchange of Groups 1 and 3, 1 and 4, 2 and 3, or 2 and 4. After all of the control rods of Groups 1, 2, 3, and 4 have been withdrawn fully from the core, the rods remaining inserted in the reactor core form a checkerboard pattern. In addition, at this checkerboard pattern point 50% of the control rods remain in the core which will be referred to as the 50% control rod density point. The control rods in the reactor core that form this checkerboard pattern have an approximately average and therefore minimum practical control rod worth. In addition, the withdrawal sequence leading to this checkerboard pattern was performed in a manner which assured the minimum practical rod worth of control rods remaining in the core at each step of the withdrawal sequence.

Another aspect of the present invention involves subdividing each of the previously discussed groups into several subgroups which may be divided on a percentage of control rod withdrawal basis where each subgroup includes all of the control rods in the group with which it is associated. To minimize the rod worth, it is desirable that the withdrawal sequence of each subgroup be completed before proceeding to the next subgroup. In addition, it is desirable to complete all of the subgroups within a group before proceeding to the next group. This procedure even further reduces the control rod worth while withdrawing the control rods in each group.

In addition to the foregoing, it has been found that the checkerboard array is uniquely suited for reactor operation. This is because it provides a pattern from which uniform power output from all fuel bundles in the core during reactor operation can be obtained. With the completion of withdrawal of Groups 1 through 4, the 50% control rod density point has been achieved with the desired checkerboard pattern. At the beginning of the fuel cycle the power level of the reactor should be above the hot standby condition when the 50% control rod density point is reached. The rod withdrawal sequence beyond the checkerboard pattern necessary to achieve the desired operating pattern can best be achieved on a symmetric withdrawal sequence. This symmetric withdrawal sequence preferably is started at the periphery of the reactor core such that the peripheral circle of rods are fully withdrawn. Then several of the central rods are withdrawn to bring the reactor up to full power. Additional central control rods will be withdrawn with increase in exposure time of the fuel.

It has been found that operating a reactor in accordance with the present invention results in a maximum rod worth ($\Delta k$) during normal operation of about 0.025 to 0.035. For a reactor not employing this invention it is possible that the maximum rod worth could be on the order of 0.050 to 0.060. Therefore, the use of pattern control in accordance with the present invention can be expected to achieve as much as a 55% reduction in the maximum control rod worth.

The subject matter which is regarded as the invention is particularly pointed out and distinctly claimed in the concluding portion of the specification. The invention, however, both as to its organization and operation, together with further objects and advantages thereof, may best be understood by reference to the following description taken in conjunction with the accompanying drawings in which:

Figure 8:
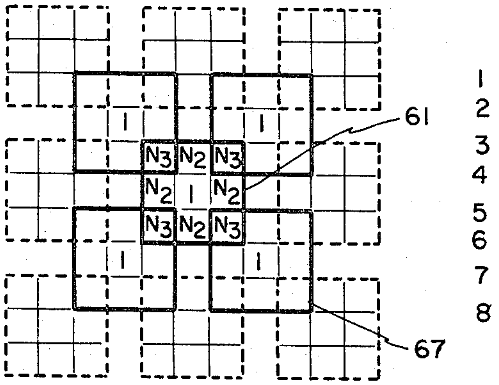
FIGURE 8 illustrates the position of the 3 x 3 arrays in network I and the control rods to be withdrawn or inserted in Group 1.
Figure 9:
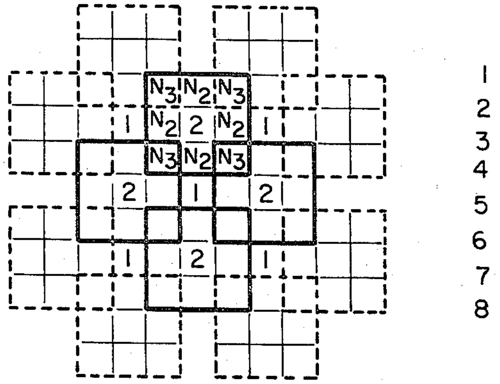
FIGURE 9 illustrates the position of the 3 x 3 arrays in network II and the control rods to be withdrawn or inserted in Group 2.
Figure 10:
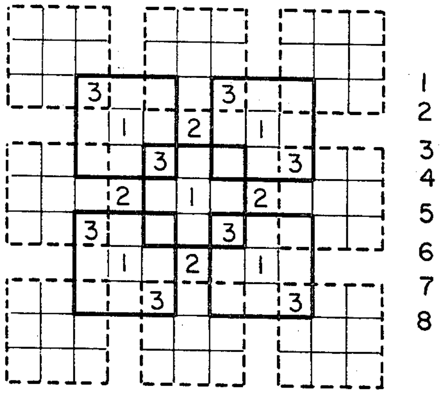
Figure 12:
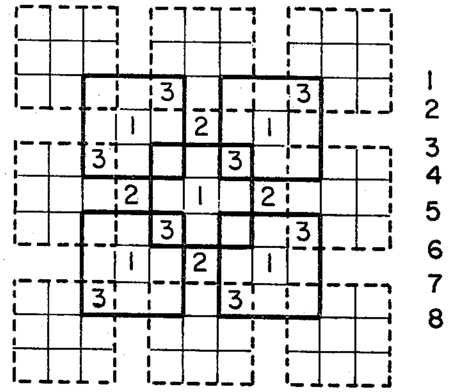
Figure 11:
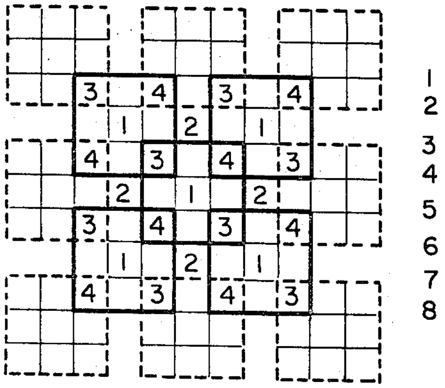
Figure 13:
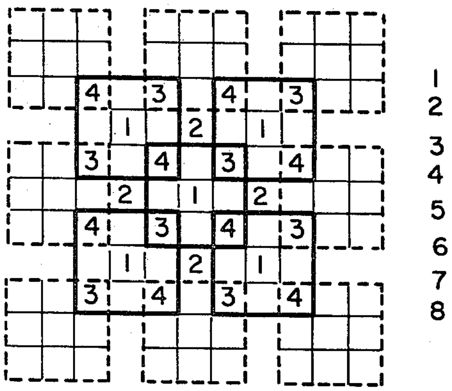
Figure 14:
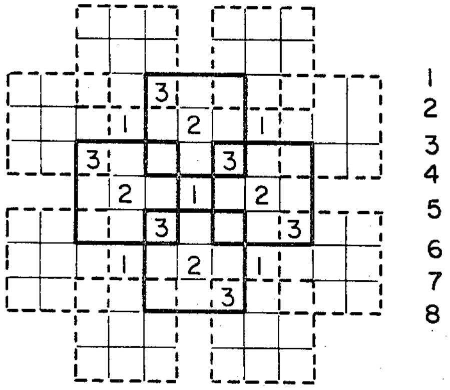
Figure 16:
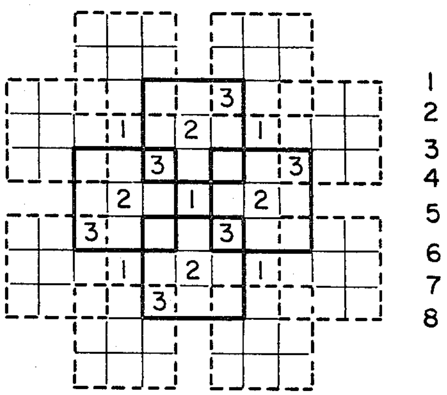
Figure 15:
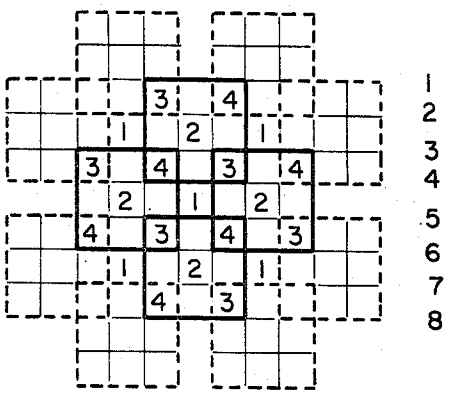
Figure 17:
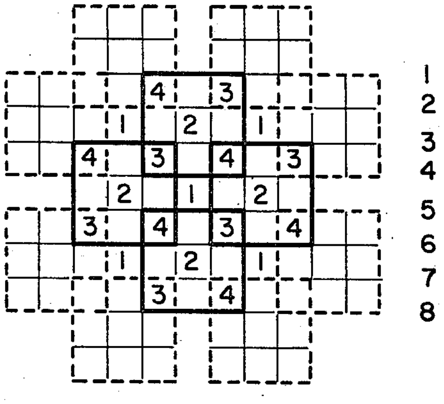
Figure 18:
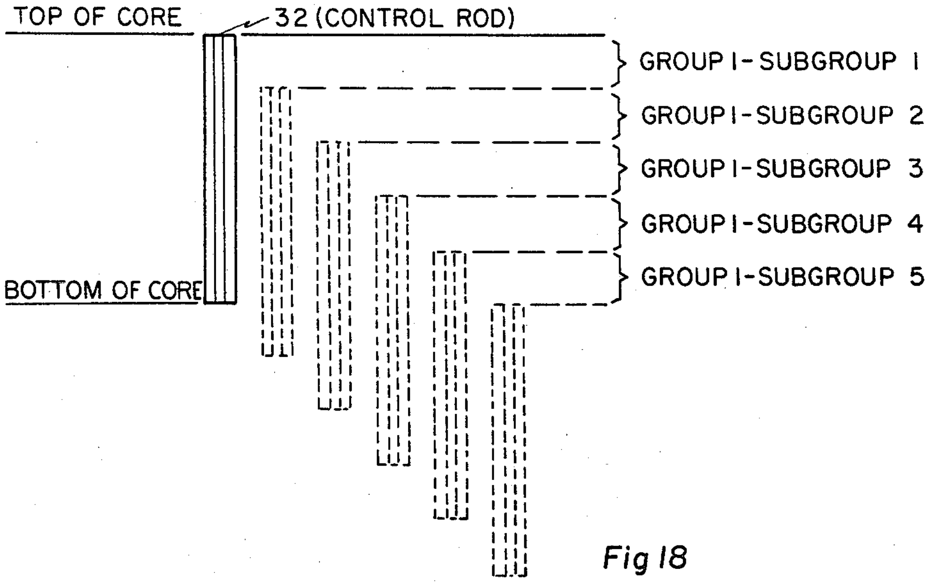
Figure 19:
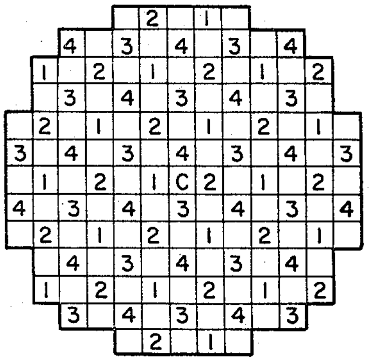
Figure 19A:
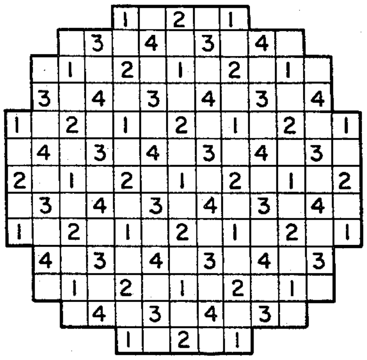
Figure 20:
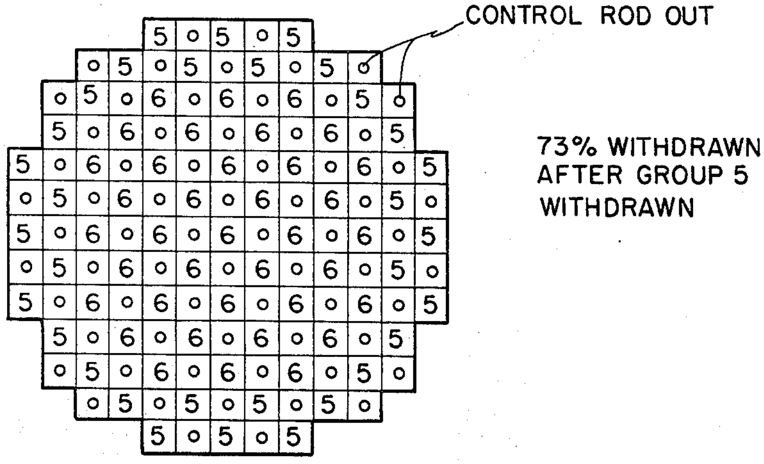
Figure 21:
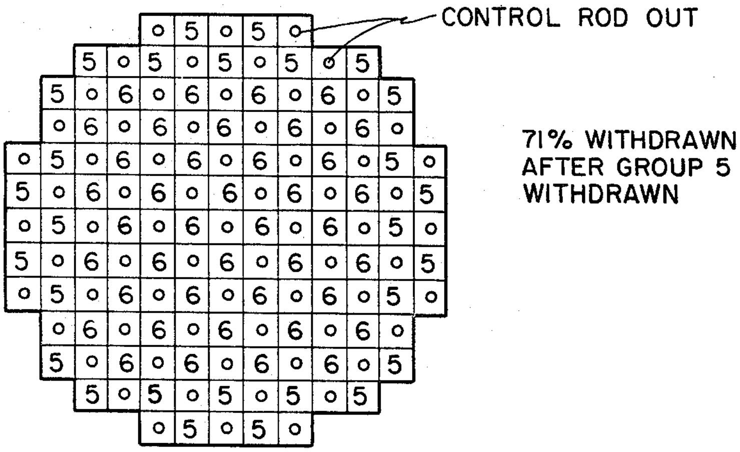
Figure 22:
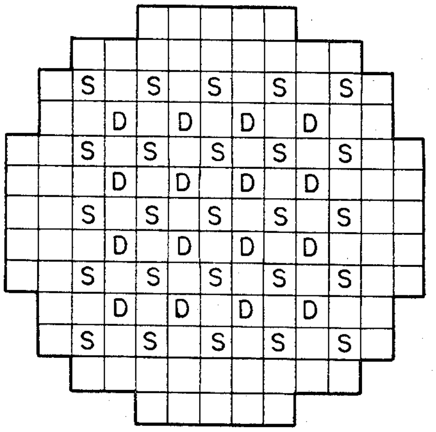
Figure 23:
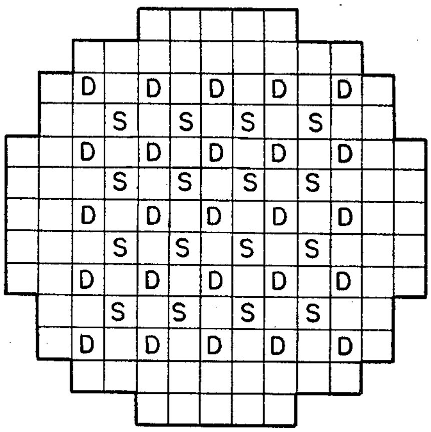

FIGURES 10 and 11 respectively represent one set (Group 3A and Group 4A) of control rod withdrawal or insertion patterns where network I of FIGURE 8 is the reference pattern;

FIGURES 12 and 13 respectively represent another set (Group 3B and Group 4B) of control rod withdrawal or insertion patterns where network I of FIGURE 8 is the reference pattern;

FIGURES 14 and 15 respectively represent one set (Group 3C and Group 4C) of control rod withdrawal or insertion patterns where network II of FIGURE 9 is the reference pattern;

FIGURES 16 and 17 respectively represent another set (Group 3D and Group 4D) of control rod withdrawal patterns where network II of FIGURE 9 is the reference pattern;

FIGURE 18 illustrates typical subgroups into which a group may be subdivided;

FIGURE 19 illustrates the Sequence A checkerboard pattern at 50% control rod density where the center control rod of the reactor core is fully inserted;

FIGURE 19A illustrates the Sequence B checkerboard pattern at 50% control rod density where the center control rod of the reactor core is fully withdrawn;

FIGURE 20 illustrates the Sequence A power operation patterns derived from the Sequence A checkerboard pattern of FIGURE 19;

FIGURE 21 illustrates the Sequence B power operation patterns derived from the Sequence B checkerboard pattern of FIGURE 19B;

FIGURES 22 and 23 illustrate two alternate power operation control rod patterns which are derived from the Sequence A power operation pattern of FIGURE 20 and are respectively referred to as Sequence A–1 and Sequence A–2.

Figure 24:
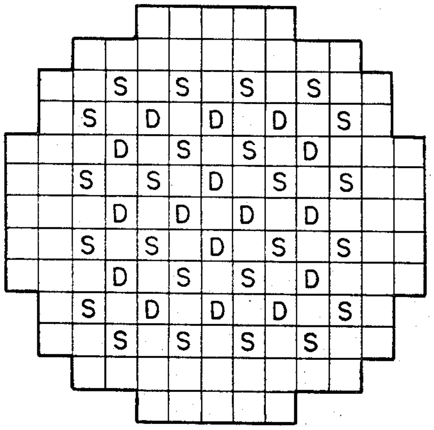
Figure 25:
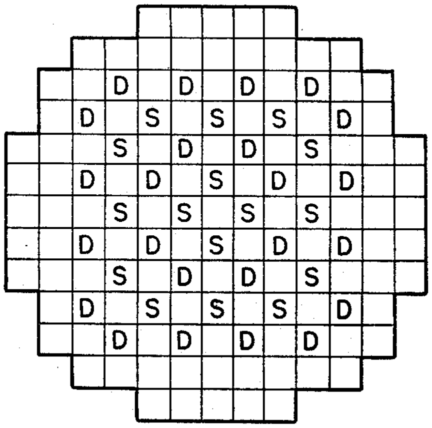

FIGURES 24 and 25 illustrate two alternate power operation control rod patterns which are derived from the Sequence B power operation pattern of FIGURE 21 and respectively referred to as Sequence B–1 and Sequence B–2.

Figure 1:
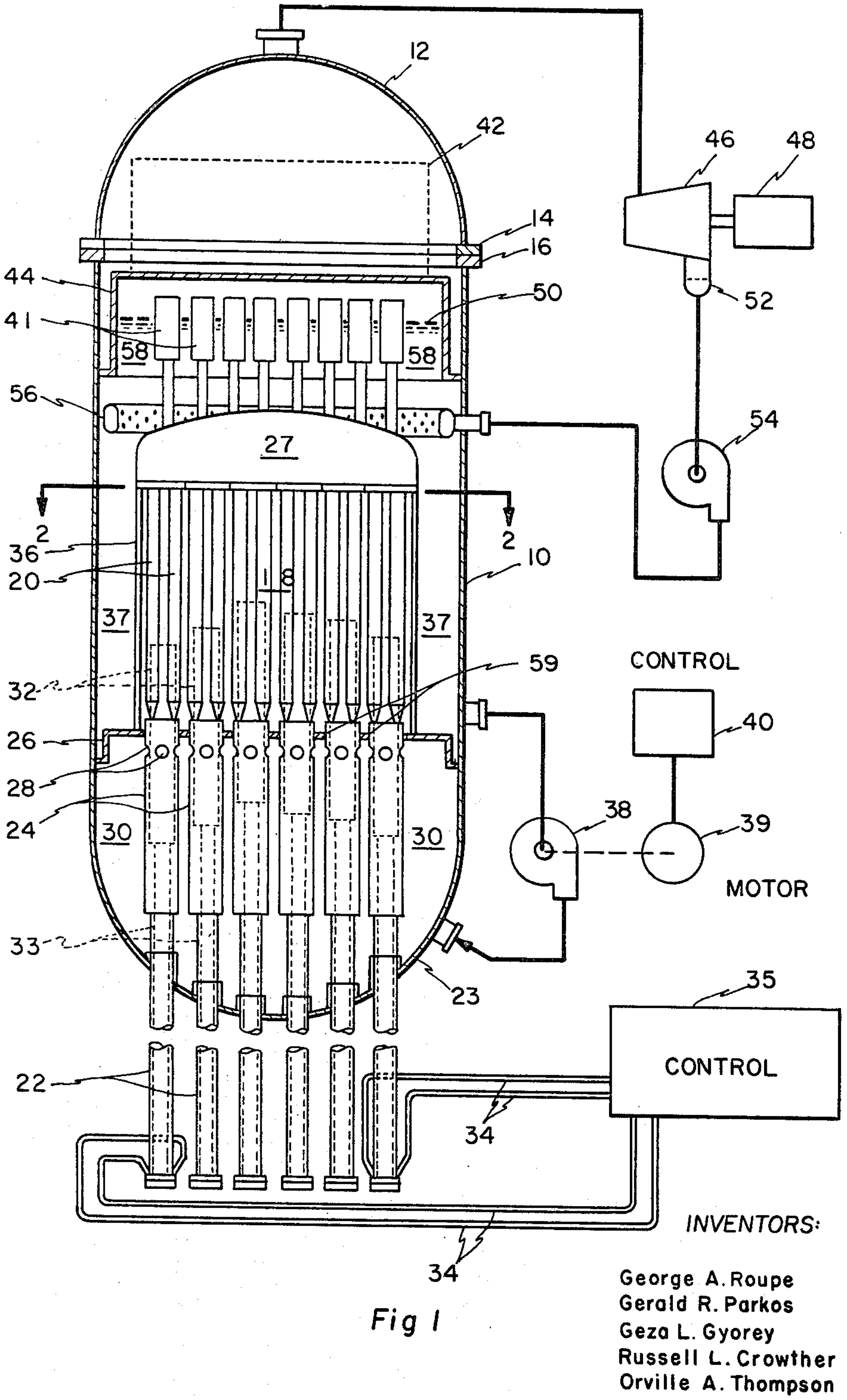
FIGURE 1 is a schematic flow diagram of a typical nuclear reactor power plant showing the reactor vessel in partial cross section and which is operated in accordance with the present invention.

In FIGURE 1 is schematically illustrated a typical nuclear reactor power plant flow diagram which may be operated in accordance with the present invention. It is to be understood that the teachings of the present invention may be used with many different types of nuclear reactor power plants such as non-boiling water moderator-coolant types, the heavy water and graphite moderated, organic moderated types, or types that employ sodium or other fluids as moderator-coolants. However, it is described here as used in a boiling water reactor since it has been found particularly useful with this type plant.

The reactor system depicted in FIGURE 1 includes reactor pressure vessel 10 provided with removable head 12 which is secured by means of flanges 14 and 16. Disposed within pressure vessel 10 is a nuclear chain reacting core 18 which includes a plurality of vertically positioned nuclear fuel bundles 20. Each fuel bundle consists of a plurality of longitudinally extending fuel rods which are positioned in spaced relation by means of top and bottom fittings which have openings to permit moderator-coolant flow. Each bundle is provided with an open ended flow channel that surrounds the fuel rods.

A plurality of control rod drive mechanisms 22 are sealed and connected to bottom head 23 of the reactor vessel by welding or the like. A plurality of longitudinally extending control rod guide tubes 24 have their lower ends secured to and are vertically and laterally supported by the inner surface of bottom head 23 by welding or the like. The upper ends of control rod guide tubes 24 are laterally supported by bottom grid plate 26. The upper end of each control rod guide tube is provided with four sockets (not shown) and a cruciform-shaped opening (not shown). Four fuel bundles 20 are supported by each control rod guide tube 24, the bottom fitting of each bundle being mounted in one of the four sockets. Each control rod guide tube is provided with openings 28, located near the upper end, that communicate with supply chamber 30 and with the sockets and the bottom fittings of the associated fuel bundles.

Control rods 32 (shown in dotted lines) control the overall power level, as well as the local power distribution of the reactor. A cruciform-shaped control rod is located in each control rod guide tube and is adapted to extend through the cruciform-shaped opening and to be moved vertically between the four associated fuel bundles 20 resting on the guide tube. Control rods 32 are operatively connected to control rod drive mechanisms 22 by control rod drive shafts 33. The positions of the control rods in the reactor core are established by operation of the individual drive mechanisms. Individual drive mechanisms 22 are hydraulically actuated by fluid supplied through conduits 34. The fluid flow is regulated by control device 35, the particular mechanical and electrical arrangement of which is well known to those skilled in the art. Control device 35 may be used to select the control rod patterns and sequences in accordance with the teachings of the present invention which will be hereinafter described in detail.

A shroud 36 is mounted coaxially within the vessel to provide a downcomer annulus 37 between the shroud and the vessel wall. Recirculation water is continuously removed from the bottom of downcomer annulus 37 by pump 38 and introduced at a controllable rate to supply chamber 30. Pump 38 is driven by motor 39, the speed of which is controlled by control device 40, the operation of which may be in accordance with that set forth in U.S. Patent No. 3,042,600 to R. D. Brooks, issued July 3, 1962.

In the operation of a typical boiling water reactor a steam-water mixture generated in core 18 is discharged into plenum 27 from which the mixture flows upward into steam separators 41. Here the steam is separated from most of the water. The separated steam flows upward to steam dryer 42, mounted on annular support member 44, which removes the remaining water. The dry steam leaving the dryer is then transmitted to turbine 46 which drives electric generator 48. Water discharged from separators 41 and dryer 42 flows downwardly and radially outward across the top of plenum 27 and between the separators toward downcomer annulus 37. Broken line 50 illustrates the water level.

Exhaust steam from turbine 46 is condensed and collected in the condenser hotwell 52. Steam condensate is removed from the hotwell by pump 54, and is pumped as feedwater to annular sparger 56, thus mixing the feedwater with the water flowing from separators 41 and steam dryer 42. Thus, recirculation water flow is upward from supply chamber 30 successively through fuel bundles 20, plenum 27, steam separators 41, upper chamber 58, downcomer 37, and back into the inlet of the recirculation pump 38. It will be appreciated that recirculation pumping may be also performed by jet pumps placed in downcomer 37.

The water flowing from supply chamber 30 is divided into two parallel streams.

The first stream, consisting of about 90% of the total flow from supply chamber 30, passes successively through openings 28 at the top of the control rod guide tubes 24, the lower fittings of the fuel bundles, into and through the flow channels of the fuel bundles, through the upper fittings of the fuel bundles, and into plenum 27. Within the flow channels, the water stream serves as a moderator-coolant for the fuel rods and in the process is partially vaporized to form a steam-water mixture.

The second stream, commonly referred to as the bypass leakage flow and consisting of the remaining 10% of the water flow from supply chamber 30, passes through annular openings 59 formed between the exterior surfaces at the upper ends of control rod guide tubes 24 and the associated openings in bottom grid plate 26. This water flows upward through the spaces formed between the outside of the nuclear fuel bundle flow channels and the control rods 32 and discharges into plenum 27 through spaces formed between the upper ends of the fuel bundle channels. This water serves to cool the control rods and fuel bundle channels to prevent the formation of steam in this region. This water also contributes to the neutron moderator effect of water flowing within the flow channels. The quality of the steam-water mixture resulting from combining the first and second streams in plenum 27 is typically about 10%.

Figure 2:
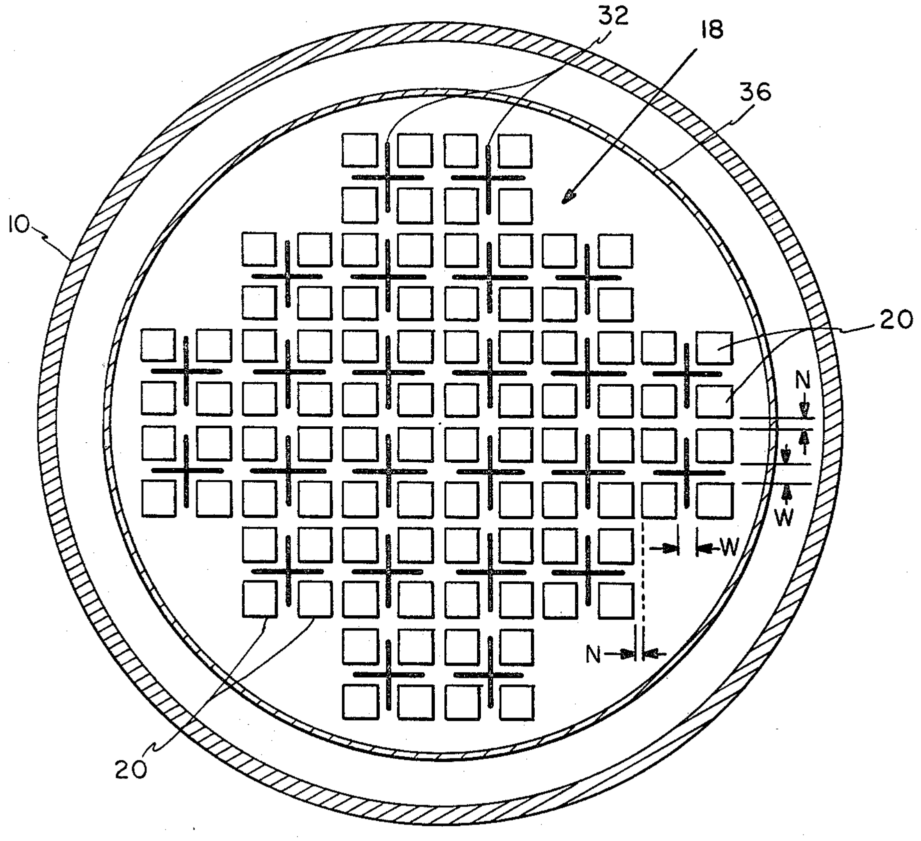
FIGURE 2 is a horizontal cross section view of the reactor vessel and core taken at Section 2—2 of FIGURE 1.

In FIGURE 2 is a cross section view of reactor pressure vessel 10 taken through the core at the level 2—2 shown in FIGURE 1. Reactor vessel 10 is shown surrounding core 18 and shroud 36. The fuel bundles 20 are grouped together in groups of four with relatively narrow spaces (N) between them to facilitate fuel bundle insertion and removal and to provide areas for instrumentation. Considerably wider spaces (W) are formed between the fuel bundles of each group to receive cruciform-shaped control rods 32 which are reciprocably positioned therebetween. Thus, two sides of each fuel bundle have adjacent control rod blade surfaces and two sides do not. Spaces (N) and (W) between the fuel form the space through which the core bypass leakage flows (the second water stream) and thus are filled with water. For purpose of illustration, the core shown in FIGURES 1 and 2 includes fewer fuel elements and control rods than would be used in a typical reactor.

Figures 3, 4, 5:
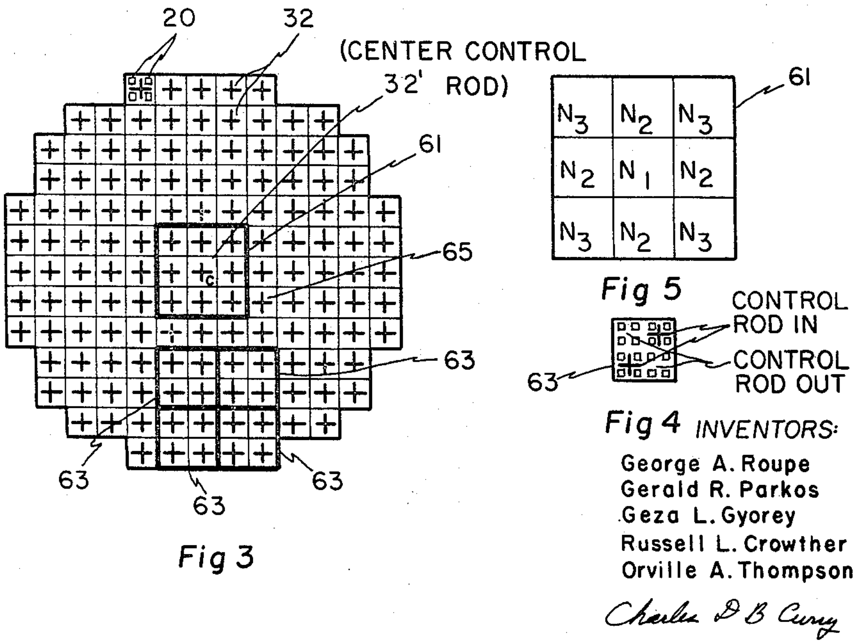
FIGURE 3 is a schematic diagram illustrating a typical reactor core which may be operated in accordance with the present invention.
FIGURE 4 illustrates a 2 x 2 array having the two control rods on one diagonal inserted and the two control rods on the other diagonal withdrawn.
FIGURE 5 illustrates the basic 3 x 3 array from which the control rod patterns and sequences of the present invention are derived.
Figures 6A, 6B, 6C, 6D, 6E:
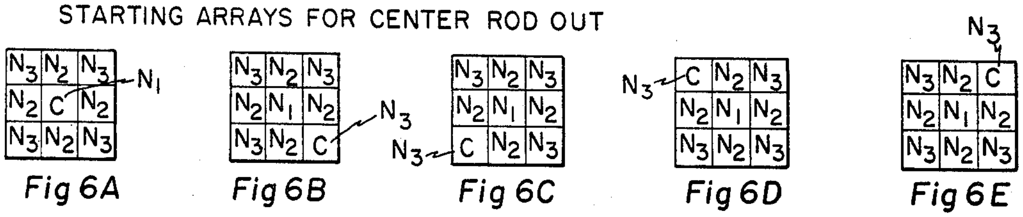
FIGURES 6A through 6E illustrate all possible starting 3 x 3 arrays for the center-rod-out checkerboard pattern (Sequence B of FIGURE 19A)
Figures 7A, 7B, 7C, 7D:
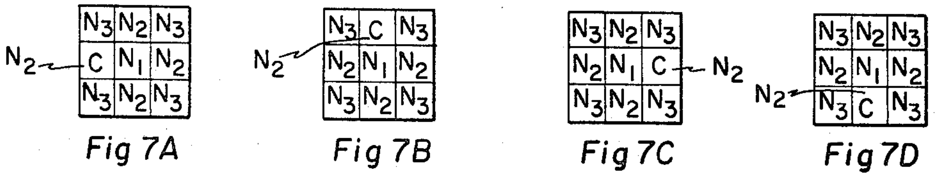
FIGURES 7A through 7D illustrate all possible starting 3 x 3 arrays for the center-rod-in checkerboard pattern (Sequence A of FIGURE 19)

In FIGURE 3 is schematically illustrated a typical reactor core which may be operated in accordance with the present invention. This core includes 137 control rods 32 and 548 fuel bundles 20 (for simplicity, the fuel bundles are illustrated in only one cell). The outer periphery of the core is shaped to approximate a circle. The reactor core has a center control rod 32' which will be used as a reference point for subsequent discussions. However, it is to be noted that any other control rod may be used as a reference point. In FIGURE 3 is also illustrated the basic 3 x 3 array 61, which is shown at the center of the reactor core only for convenience, upon which the control system of the present invention is derived.

To operate a reactor properly, the control rod withdrawal sequence must ultimately yield a desirable control rod pattern for power operation. In general, a desirable power operation control rod pattern is one which maintains a relatively uniform power distribution over the core. Power operation patterns which have been found particularly useful are illustrated in FIGURES 20 through 25. These power operation patterns can be developed from the 50% control rod density checkerboard pattern of the present invention shown in FIGURES 19 and 19A. This checkerboard pattern is established when all 2 x 2 arrays 63 (see FIGURES 3 and 4) have their control rods on one diagonal inserted and on the other diagonal withdrawn.

In an infinite array, this checkerboard control rod pattern will maintain the control rod worth of all inserted rods at the average, and therefore the minimum value, with the magnitude of the individual control rod worths being dependent only on the fuel parameters such as the infinite multiplication factor of the uncontrolled fuel ($k_\infty^{uc}$), neutron migration area ($M^2$) and movable control system strength ($\Delta k/k$). In a finite array, such as that illustrated in FIGURE 3, the rod worths near the outer periphery of the core may be lower than the average, due to their lower neutron flux as a result of neutron leakage. If this were the case it would appear that the checkerboard array, at 50% control rod density would not yield the minimum possible value of control rod worth. By withdrawing more control rods on the outer periphery of the core it is possible to increase the flux at the periphery of the core which has the effect of establishing the condition where every control rod again has the average (and therefore the minimum) worth. However, this is not necessary since the flux in a nuclear reactor is not uniform across the entire core and usually the fuel on the periphery has a greater uncontrolled excess neutron multiplication which may be due to exposure gradient or burnable poison distribution. This will tend to offset the above mentioned core leakage effect in a finite core and force the rod worth of the maximum worth rod to be near the average (minimum) valve. It can therefore be seen that the checkerboard pattern from which the operating patterns of FIGURES 20 through 25 are derived is uniquely suited for achieving minimum control rod worth throughout the entire core including the outer periphery.

As previously indicated, there are many different sequences of control rod withdrawal which could be used to arrive at the checkerboard patterns shown in FIGURES 19 and 19A. The present invention is concerned with unique control rod withdrawal sequences which is used to arrive at these checkerboard configurations. To achieve this objective it is necessary that the worth of the control rods remaining in the core, at each step of the withdrawal sequence, are as near to an average value (or minimum value) as possible. This has been achieved by utilizing the basic 3 x 3 array depicted in FIGURE 5. The 3 x 3 array makes it possible to have unique wihdrawal patterns such that the first and second groups (Group 1 and Group 2 of FIGURES 8 and 9, respectively) of withdrawn rods shall not have their nearest neighbors ($N_2$) or their next nearest neighbors ($N_3$) withdrawn. It should be noted that the control rods located at the center positions ($N_1$) of the 3 x 3 arrays of networks I and II will be withdrawn from Group 1 and Group 2 as will be hereinafter described with respect to FIGURES 8 and 9. $N_1$ of the 3 x 3 array of FIGURE 5 refers to the center control rod of the 3 x 3 array, but not necessarily the center control rod of the reactor core as will be described with respect to FIGURES 6A through 6E and 7A through 7D. The rods withdrawn in the third and fourth groups (Group 3 and Group 4 of FIGURES 10 through 17) are the next nearest neighbors ($N_3$) whereas the nearest neighbors ($N_2$) are not withdrawn until after tht 50% control rod density point has been achieved. During power operation of the reactor it has been found desirable to operate the reactor from patterns in which the center rod is inserted (Sequence A of FIGURE 19) or the center rod is withdrawn (Sequence B of FIGURE 19A). As previously noted, the center rod of the reactor core is used as a reference only from the standpoint of convenience; however, the following description of control rod patterns and sequences will be derived from this reference and the 3 x 3 arrays.

FIGURES 6A through 6E and 7A through 7D illustrate all possible starting 3 x 3 arrays. The particular position of the starting array with respect to the center rod of the reactor core will establish the positions of network I and Group 1 (see FIGURE 8) in the reactor core. The positions of network II and Group 2 (see FIGURE 9) are derived from network I.

In FIGURES 6A through 6E are illustrated all possible starting 3 x 3 arrays for the center-rod-out checkerboard pattern (Sequence B). In the FIGURE 6A arrangement, the center rod of the reactor core would be removed during removal of the Group 1 control rods and in the starting arrays of FIGURES 6B through 6E the center rod of the reactor core will be removed during either the Group 3 or Group 4 operations. In FIGURES 7A through 7D are illustrated all possible starting 3 x 3 arrays which may be used to achieve the center-rod-in checkerboard pattern (Sequence A). This is achieved by selecting the 3 x 3 array in the reactor core such that the center rod of the reactor core is positioned at any one of the nearest neighbor ($N_2$) positions. With this selection of the network I or Group 1 3 x 3 arrays the center control rod is never withdrawn in the process of achieving the checkerboard pattern since it is the nearest neighbor ($N_2$). As will hereinafter become apparent, the center rod of the reactor core and nearest neighbor ($N_2$) rods will be removed only after the checkerboard pattern has been formed and during power operation.

Referring now to the operation of the reactor in accordance with the present invention, the following summary is provided for purpose of introduction.

Each of the two sequences (A and B) of FIGURES 19 and 19A are formed by the sequential withdrawal of four basic groups of control rods which will be referred to as Group 1, Group 2, Group 3 and Group 4 of FIGURES 8 through 17. These control rod groups are withdrawn in seqeunce and all of the control rods in each group are completely (with some infrequent exceptions) withdrawn prior to proceeding to the next group.

The particular positions of these four basic groups of control rods in the reactor core are derived from two geometric networks which will be referred to as network I and network II. For convenience, network I and Group 1 are shown together in FIGURE 8, and network II and Group 2 are shown together in FIGURE 9. Each of these networks is composed of a plurality of overlapping 3 x 3 square arrays of control rods, and each array thus includes nine control rods.

As illustrated in FIGURE 8, network I comprises a plurality of 3 x 3 arrays formed in the reactor core such that the control rod in each of the corner positions of each array is common with the control rod in the corner position of a diagonally adjacent 3 x 3 array.

As illustrated in FIGURE 9, network II comprises a plurality of 3 x 3 arrays formed in the reactor core such that adjacent pairs of control rods in the corner positions of each array are common with adjacent pairs of control rods in the corner positions of adjacent arrays of network I.

As illustrated in FIGURE 8, Group 1 consists of all of the control rods in the center positions of the 3 x 3 arrays of network I and are identified by reference numeral 1. As illustrated in FIGURE 9, Group 2 consists of all of the control rods in the center positions of the 3 x 3 arrays of network II and are identified by reference numeral 2. As illustrated in FIGURES 10, 12, 14 and 16, all of Group 3 consists of corner control rods positioned along selected diagonals in the 3 x 3 arrays of either network I or network II and are identified by reference numeral 3. These diagonals, when extended beyond their arrays, are either common with or parallel to the selected other diagonals. As illustrated in FIGURES 11, 13, 15 and 17, Group 4 consists of the remaining corner control rods in the 3 x 3 arrays of the same network and are identified by reference numeral 4. These remaining corner control rods lie along diagonals bearing a perpendicular relation to the selected diagonals.

Referring to FIGURE 8, it is to be understood that the illustrated network I of 3 x 3 arrays repeats itself throughout the entire reactor core and this repetition is indicated by the 3 x 3 arrays shown by dotted lines. Because the location of the arrays of FIGURE 8 are generic to the present invention, these 3 x 3 arrays are not defined with respect to a fixed reference such as the center control rod of the reactor core. It should be noted that 3 x 3 array 61 of FIGURE 8 could be any of the starting arrays shown in FIGURES 6A through 6E (center-rod-in) or any of the starting arrays shown in FIGURES 7A through 7D (center-rod-out). In addition, it should be noted that by changing the reference control rod to control rod 65 of FIGURE 3, for example, then 3 x 3 array 67 of FIGURE 8 would have control rod 65 as the center rod of that array and 3 x 3 array 61 of FIGURE 3 would have the center control rod of the reactor core as its center rod which would correspond to the starting arrays shown in FIGURE 6A.

As previously stated, in Group 1 of FIGURE 8 the withdrawal of the control rods from the core is limited to the center rod of each of the 3 x 3 arrays and all of the center rods of the 3 x 3 arrays in the reactor core must be withdrawn prior to proceeding to the next group (Group 2). Accordingly, the reactor operator or the automatic machine, as the case may be, must cause the withdrawal of the center rods of Group 1. By selecting this withdrawal sequence it can be seen that there has not been a withdrawal of a nearest control rod ($N_2$) or a next nearest control rod ($N_3$) in any of the 3 x 3 arrays of network I.

The Group 1 control rods are arranged such that the actual effect on maximum rod worth due to the particular withdrawal sequence within Group 1 is of only second order importance. However, if desired, Group 1, as well as other hereinafter described groups, can be subdivided in such a way as to achieve withdrawal of the centrally located Group 1 rods first and the peripherally located Group 1 rods last. This "in-to-out" withdrawal sequence may be desirable if the startup instrumentation is located within the core since the instruments will be more sensitive to changes in reactivity if the center rods are removed first. Also, it may be desirable to remove the center rods of Group 1 first since poison curtain density in the vicinity of the peripheral bundles is often reduced which, during the cold condition of the reactor, may overcompensate for core leakage and result in an excess multiplication factor in the peripheral bundles. Other subdivisions of these groups may be made as needed. However, all subdivided groupings of a given group must be completed prior to proceeding to the next group.

In FIGURE 9 is illustrated the next group of control rods that are to be withdrawn from the reactor core. This group (Group 2) of control rods is selected such that the 3 x 3 arrays of network II do not include a withdrawn rod at either the nearest ($N_2$) or next nearest ($N_3$) control rod positions. It can also be seen that this network of 3 x 3 arrays is selected such that the two corners common to one side of each 3 x 3 array are common with the two corners of the 3 x 3 arrays of network I of FIGURE 8. That is, the upper next nearest ($N_3$) control rods of the 3 x 3 arrays of network I are common to the lower next nearest ($N_3$) control rods of the 3 x 3 arrays of network II as viewed in FIGURES 8 and 9. The 3 x 3 arrays of network II also result in a network in which the corner control rod of each array is common with the corner control rod of an adjacent array as was the case with the network I arrays. After the 3 x 3 arrays of network II have been established the center control rod of each array is then withdrawn which results in the pattern illustrated in FIGURE 9. These center rods of Group 2 are indicated by reference numeral 2 in FIGURE 9 and reference numeral 1 in FIGURE 9 illustrates the withdrawn control rods of Group 1 as previously described.

At this point of reactor startup there is an increase in the reactivity of the nuclear reactor, however, it is below that necessary for the reactor to become critical. During this period of operation it is important that all of the control rods of Group 1 be first withdrawn, then all of the control rods of Group 2 be withdrawn and that no other control rods be withdrawn. Noncompliance with this sequence may result in a high rod worth which may result in nuclear excursions or set up situations which may later result in a nuclear excursion.

After all of the control rods from Groups 1 and 2 have been withdrawn, the control rods from Groups 3 and 4 may be withdrawn starting either with network I as a reference pattern or network II as a reference pattern. These alternative starting patterns for Group 3 (to be followed by Group 4) permit the reactor operator greater flexibility of operation. In FIGURES 10, 11, 12 and 13 are illustrated two sets of Group 3 and Group 4 control rod withdrawal sequences that may be made using network I as the reference pattern. In FIGURES 14, 15, 16 and 17 are illustrated another two sets of Group 3 and Group 4 control rod withdrawal sequences that may be made using network II as the reference pattern.

The first set of rod withdrawal sequences is referred to as Groups 3A and 4A of FIGURES 10 and 11 and the second set is referred to as Groups 3B and 4B of FIGURES 12 and 13. In FIGURE 10 is illustrated the Group 3A withdrawal pattern which is derived from network I of FIGURE 8 and constitutes one of the two groups in the above mentioned first set. In Group 3A, the control rods to be withdrawn are the two corner rods positioned along a selected diagonal of each of the 3 x 3 arrays where all of the selected diagonals extend in the same direction. From FIGURE 10 it can be seen that these rods are the lower right and upper left control rods of each of the 3 x 3 arrays. FIGURE 10 also illustrates the position of all of the control rods that have been withdrawn from the 3 x 3 arrays and it should be noted that minimum rod worth is provided since the Group 3A corner rods are the next nearest neighbors ($N_3$) to both the Group 1 and Group 2 control rods.

In FIGURE 11 is illustrated the Group 4A withdrawal pattern which immediately follows the withdrawal of the Group 3A control rods and constitutes the other group of the first set. From FIGURE 11 it can be seen that the Group 4A control rods are located in the lower left and upper right corners of the 3 x 3 arrays of Groups 1 and 3A and are the next nearest neighbors ($N_3$) of the Group 1 control rods. Upon withdrawal of all of the Group 1, Group 2, Group 3A and Group 4A control rods, there will be a 50% control rod density and a resultant checkerboard pattern of control rods as depicted in FIGURES 11 and 19. It should be particularly noted that minimum rod worth is achieved since no single control rod in the checkerboard array has its nearest neighbor ($N_2$) withdrawn.

In FIGURE 12 is illustrated the Group 3B withdrawal pattern which is derived from network I of FIGURE 8 and constitutes one of the two groups of the above mentioned second set. In Group 3B, the control rods to be withdrawn are the two corner rods positioned along a selected diagonal of each of the 3 x 3 arrays where all of the selected diagonals extend in the same direction but are perpendicular to the diagonals of Group 3A of FIGURE 10. From FIGURE 12, it can be seen that these rods are the lower left and upper right control rods of each 3 x 3 array, rather than the lower right and upper left control rods as in Group 3A of FIGURE 10. As with Group 3A, the withdrawal of the Group 4A control rods results in a minimum rod worth since the Group 4A corner rods are the next nearest neighbors ($N_3$) to both the Group 1 and Group 2 control rods.

In FIGURE 13 is illustrated the Group 4B withdrawal pattern which immediately follows the withdrawal of the Group 3A control rods and constitutes the other group of the second set. From FIGURE 13, it can be seen that the Group 4B control rods are located in the lower right and upper left corners of the 3 x 3 arrays of Groups 1 and 3B and are the next nearest neighbors ($N_3$) of the Group 1 control rods. Upon withdrawal of all the Group 1, Group 2, Group 3B and Group 4B control rods, there will be a 50% control rod density and a resultant checkerboard pattern of control rods as depicted in FIGURES 12 and 19. Again, it should be particularly noted that minimum rod worth is achieved since no single control rod in the checkerboard array has its nearest neighbor ($N_2$) withdrawn.

From the above discussion, it will be apparent that the checkerboard pattern can be arrived at from the 3 x 3 array of network I in either of two sets of group sequences. These are, (1) Group 1, Group 2, Group 3A and Group 4A, and (2) Group 1, Group 2, Group 3B and Group 4B. It is also possible to arrive at the same checkerboard pattern from the 3 x 3 arrays of network II rather than from the 3 x 3 arrays of network I. This is achieved by either of two courses.

The first course is to withdraw groups in accordance with the following sequence. Group 1, Group 2, Group 3C (FIGURE 14) and Group 4C (FIGURE 15). From FIGURE 14, it can be seen that in Group 3C the lower right and upper left control rods are withdrawn from the 3 x 3 arrays of network II and from FIGURE 16 it can be seen that in Group 4C the lower left and upper right control rods are withdrawn from the network II arrays. From FIGURE 15, it can also be seen that the resultant pattern is that of a checkerboard which has the same final configuration as the checkerboard patterns shown in FIGURE 11.

The second course is to withdraw control rods in accordance with the following sequence. Group 1, Group 2, Group 3D (FIGURE 16) and Group 4D (FIGURE 17). In this sequence, the Group 3D rods are selected from the lower left and upper right corners of the 3 x 3 arrays of network II as viewed in FIGURE 16. The Group 4D rods are selected from the lower right and upper left corners of the 3 x 3 arrays of network II as viewed in FIGURE 17. It should be also noted that the checkerboard pattern resulting from this withdrawal sequence is the same as that of the previously described sequences.

The following is a summary of the group sequences which may be used in arriving at the desired checkerboard pattern.

(1) Group 1, Group 2, Group 3A (from Group 1) Group 4A (from Groups 1 and 3A)
(2) Group 1, Group 2, Group 3B (from Group 1), Group 4B (from Groups 1 and 3B)
(3) Group 1, Group 2, Group 3C (from Group 2), Group 4C (from Groups 2 and 3C)
(4) Group 1, Group 2, Group 3D (from Group 2), and Group 4D (from Groups 2 and 3D).

The above described sequences are the basic sequences required to maintain minimum rod worth of the control rods in the reactor core. However, it is to be understood that these same sequences may be described in other ways. For example, Sequence A of FIGURE 19 was defined as Group 1, Group 2, Group 3A or 3C and, Group 4A and 4C. From FIGURE 19 it can be seen that the starting 3 x 3 array was that shown in FIGURE 7C for the center-rod-in situation. It should be noted that if the starting 3 x 3 array had been selected as that shown in FIGURE 7D, then control rods identified as Group 4 in FIGURE 19 would be the rods initially withdrawn and could therefore be redefined as Group 1 rods. Therefore, the withdrawal sequence may be redefined, by this selected example, as Group 4, Group 3, Group 2 and Group 1. This same analysis may be made if the FIGURE 7A and 7B had been assumed as the starting arrays where the respective withdrawal sequences would be Group 2, Group 1, Group 3, and Group 4 and Group 3, Group 4, Group 1 and Group 2. In like manner, this equivalent analysis may be made with respect to Sequence B (center-rod-out) of FIGURE 20 and with starting arrays 6A through 6E where array 6A corresponds to FIGURE 19A. The following table is a summary of all possible combinations of permissible withdrawal and insertion sequences:

PERMISSIBLE WITHDRAWAL AND INSERTION SEQUENCES

| Group | Group | Group | Group |
|---|---|---|---|
| 1 | 2 | 3 | 4 |
| 1 | 2 | 4 | 3 |
| 2 | 1 | 3 | 4 |
| 2 | 1 | 4 | 3 |
| 4 | 3 | 2 | 1 |
| 4 | 3 | 1 | 2 |
| 3 | 4 | 2 | 1 |
| 3 | 4 | 1 | 2 |

It should be particularly noted that Groups 1 and 2 may be interchanged and that Groups 3 and 4 may be interchanged. However, Groups 1 or 2 may not be interchanged with Groups 3 or 4 since this would set up high rod worth patterns. For example, the group Sequence 1, 3, 2 and 4 would be undesirable for the following reasons. The worth of the Group 3 rods (when withdrawn in the second step) would be greater than the worth of the Group 2 rods (when withdrawn in the second step) since the Group 3 rods are much closer to the Group 1 rods (one on each side) than are the Group 2 rods (most distant position possible from the Group 1 rods). Therefore, when the Group 1 rods are withdrawn, the fuel bundles adjacent to the withdrawn Group 1 rods will generate neutrons, many of which have a length of travel of one foot in the radial direction, which will generate a higher flux in the vicinity of the Group 3 rods than in the vicinity of the Group 2 rods. In fact, the Group 2 rods receive the least possible neutrons from the fuel bundle adjacent the Group 1 rods since they are furthest removed. The Group 4 rods would have the same high rod worth as do the Group 3 rods if they were withdrawn immediately after the Group 1 rods. Note also that the nearest control rod ($N_2$) is not withdrawn until after the checkerboard pattern is formed. Furthermore, the Group 3 and Group 4 rods are spaced the maximum possible distance from each other and are spaced the maximum possible distance from the Group 1 and Group 2 rods which were previously withdrawn. It can therefore be seen that any one of the above described withdrawal sequences provides the minimum control rod worth while maintaining an evenly dispersed pattern throughout the reactor core.

The heretofore discussed control rod withdrawal patterns have been limited to the complete withdrawal or complete insertion of any selected control rod. For example, any selected control rod within Group 1 was either fully withdrawn or fully inserted and each of the rods within that group were either fully withdrawn or fully inserted. There are situations in which control rod worth may be further reduced by subdividing each of the previously discussed groups into several subgroups. These subgroups may be divided on a percentage of control rod withdrawal basis. For example, the axial withdrawal of any given control rod may be subdivided into five different subgroups, as illustrated in FIGURE 18, where each subgroup represents 20% of the total length of control rod withdrawal. In FIGURE 18 control rod 32 is shown in the fully inserted position as well as in various positions of percentage withdrawal as shown by dotted lines and identified by Group 1—subgroups 1 through 5. In order to minimize the rod worth, it is desirable that the withdrawal sequence of each subgroup be completed before proceeding to the next subgroup. For example, all of the Group 1 control rods should be removed to the 20% withdrawn position of subgroup 1 before any of those rods are withdrawn to the 40% position of subgroup 2. Therefore, the Group 1 rods are withdrawn first in accordance with subgroup 1, then in accordance with subgroup 2, then in accordance with subgroup 3, then in accordance with subgroup 4 and finally in accordance with subgroup 5. After the completion of Group 1—subgroup 5, the next step is to proceed to Group 2 which also may be arranged in subgroups as was Group 1. The procedure to be followed if Group 2 is broken down into subgroups is the same as that defined with respect to Group 1. After Group 2 is completed (along with any subgroups that may be included) the Group 3 rods are withdrawn (which may also include subgroups) and then finally the Group 4 rods are withdrawn (which may also include subgroups). The withdrawal of Group 4 and all subgroups results in the checkerboard pattern previously described. As previously indicated, the subgrouping shown in FIGURE 18 are only illustrative and different numbers of subgroups may be selected depending upon the characteristics of the reactor core and the required degree of rod worth minimizing necessary. The reason that subgroups are useful in minimizing the rod worth is the remaining rods in the reactor core will more nearly approach the average and therefore minimum rod worth value when small increments of rod withdrawal are employed.

In FIGURES 19 and 19A are illustrated the two possible 50% control rod density checkerboard patterns which may be made in accordance with the present invention. The pattern shown in FIGURE 19 is referred to as Sequence A and has the center control rod in the fully inserted position. The pattern illustrated in FIGURE 19A is referred to as Sequence B and has the center rod in the fully withdrawn position. Sequence A is achieved by initially selecting one of the starting arrays illustrated in FIGURES 6A through 6E and then proceeding with Groups 1 through 4 which result in the final checkerboard pattern. The numbers shown in the core of FIGURE 19 illustrate the location of the particular control rod groups withdrawn from the reactor core. From the previous discussion it can be seen that the sequences used in arriving at the checkerboard pattern of FIGURE 19 was the sequential withdrawal of Group 1, Group 2, Group 3A or Group 3C, and finally Group 4A or 4C. Other group sequences could be used as previously described. Sequence B (center rod out) is achieved by initially selecting one of the starting arrays illustrated in FIGURES 7A through 7D and proceeding with Groups 1 through 4 which result in the final checkerboard pattern shown in FIGURE 19A. The numbers shown in the core of FIGURE 19A illustrated the particular control rod groups withdrawn from the reactor core. The sequences used in arriving at the checkerboard pattern of FIGURE 19A was the sequential withdrawal of Group 1, Group 2, Group 3B or 3D, and finally Group 4B or 4D. Other group sequences could be used as previously described. Sequences A and B are particularly useful during "rod swap" operations which are performed during reactor operation and typically at about two month intervals.

For a new core, hot standby condition (essentially zero power output) will be achieved when about 45% to 55% of the control rods are withdrawn. To bring the reactor into power operation, it is now necessary to withdraw additional control rods. With a new core, 100% of rated power output will be achieved when about 70% of the control rods have been withdrawn. In a boiling water reactor, as each rod is withdrawn, additional boiling occurs which reduces the moderator and brings the core into equilibrium at a new power level. During the first several weeks of reactor operation, there is a rapid buildup of xenon and samarium poisoning in the fuel so that it is necessary to withdraw an additional 5% of the control rods resulting in about 75% withdrawal at 100% of rated power. Following the xenon and samarium buildup, the fissionable isotope $Pu^{239}$ is formed by $U^{238}$ neutron capture yielding $Np^{239}$ which quickly decays into $Pu^{239}$. This $Pu^{239}$ buildup will actually result in an increase in $k_\infty$ of the reactor and will therefore require the insertion of perhaps 1% of the control rods during the next few months of operation. After this period, there will be a nearly linear decrease in the $k_\infty$ or reactivity of the fuel so that it will be necessary to gradually withdraw the remaining control rods in the reactor to maintain the reactor at 100% of rated power. With a new core, a reactor is typically operated for 1.5–2 years wthout refueling. During this period, there will be periodic control rod swapping to maintain uniform fuel exposure and periodic shutdowns for other reasons such as the redistribution of fuel bundles and maintenance. At the end of the first cycle, about 98% of the control rods will have been withdrawn at 100% rated power. The remaining 2% are necessary to achieve proper core characteristics such as uniform power distributions which prevent excessive heating. The reactor is then shut down for refueling. When shut down, a partial load of new fuel is inserted into the reactor such that it will then operate for a typical period of one year. Annual partial reloading will continue thereafter. During all of the startup, shutdown, and rod swapping operations, the present invention is employed in the manners described herein.

The preferred withdrawal sequence beyond the 50% density point for Sequences A and B of FIGURES 19 and 19A are respectively illustrated in the power operation patterns of FIGURES 20 and 21. The power operation patterns of FIGURES 20 and 21 are respectively referred to as Sequence A and Sequence B, since they are respectively derived from the Sequence A and Sequence B 50% density patterns of FIGURES 19 and 19A. In FIGURES 20 and 21, the small circles denote withdrawn control rods which correspond to reference numerals 1 through 4 of FIGURES 19 and 19A, respectively. Reference numerals 5 and 6 of FIGURES 20 and 21 denote Group 5 and Group 6 control rods which are to be withdrawn in the following described manner.

In FIGURE 20 is illustrated the Sequence A power operation patterns where the center rod remains inserted and, during power operations, the control rods are sequentially withdrawn according to Groups 5 and 6. The peripheral control rods, Group 5, are initially withdrawn because this provides more uniform power flattening characteristics of the reactor core since this peripheral control rod removal compensates for the neutron leakage in the peripheral regions. After all of the Group 5 rods have been withdrawn, the Group 6 rods are selectively withdrawn during the reactor operation in the hereinafter described manner.

In FIGURE 21 is illustrated the Sequence B power operation patterns where the center rod is withdrawn and the control rods are sequentially withdrawn according to Groups 5 and 6. The peripheral control rods, Group 5, are initially withdrawn for the reasons stated with respect to Sequence A. It should be noted that the worth of all the rods in the reactor are at a minimum and therefore any particular sequence of Group 5 withdrawal is permissible from a rod worth standpoint. After the Group 5 rods have been withdrawn, the Group 6 rods are selectively withdrawn during the reactor operation in the hereinafter described manner.

In FIGURES 22 through 25 are illustrated Group 6 withdrawal patterns which may be used during power operation. In these figures the reference characters S represent a shallow control rod insertion, which may be defined as an insertion no further than ⅓ into the core, and the reference character D represents control rods that have a deep insertion into the reactor core, which may be defined as an insertion of ⅔ or more into the reactor core. All of the remaining cells of these figures have the control rods withdrawn. It should be noted that the sequence of withdrawal of these control rods may be in approximately concentric rings. Therefore, within a generally circular region in the center of the core, the control rods are positioned to hold the power density as constant as possible. This is achieved by keeping the patterns symmetrical, and as uniform as possible within the central circular region.

FIGURES 22 and 23 illustrate two alternate power operation control rod patterns which are derived from Sequence A of FIGURE 20 (center control rod inserted) and are respectively referred to as Sequence A–1 and Sequence A–2. The operating pattern of FIGURE 22 consist of sequentially withdrawing the center rod, leaving the first or inner ring of control rods in place, withdrawing the second ring of control rods, leaving the third ring in place and withdrawing the fourth or outer ring of control rods. In FIGURE 23 the center control rod is left inserted and in sequence, the first or inner ring of control rods are withdrawn, the second ring of control rods remain inserted, the third ring of control rods are withdrawn and the fourth or outer ring of control rods remain inserted. From FIGURES 22 and 23 it can be seen that the control rod withdrawal patterns are derived from the checkerboard pattern and are selected such that rod swapping is easily achieved during power operation. This is because the center and four rings of control rods are oppositely positioned and may be easily interchanged. It should also be noted that even though the center rod is withdrawn, as in Sequence A–1 of FIGURE 22, that both Sequences A–1 and A–2 of FIGURES 22 and 23 are derived from Sequence A which was a 50% density checkerboard pattern having the center rod inserted. Rod swapping is also possible between Sequence A and Sequence B.

FIGURES 24 and 25 illustrate two alternate power operation control rod patterns which are derived from Sequence B of FIGURE 21 (center rod withdrawn) and are respectively referred to as Sequence B–1 and Sequence B–2. The operating pattern Sequence B–1 of FIGURE 24 has the inner ring of control rods inserted, the second ring withdrawn, the third ring inserted, and the fourth or outer ring withdrawn. The operating pattern Sequence B–2 of FIGURE 25 has the first of inner ring of control rods withdrawn, the second ring of control rods inserted, the third ring of control rods withdrawn and the fourth ring of control rods inserted.

There are situations in which it is not necesary to follow the above described control rod patterns and withdrawal or insertion sequences. In general, this occurs when (1) the power level of the core exceeds a predetermined minimum value or (2) when a large fraction of the control rods have been withdrawn.

The first of these conditions is largely a function of the reactor design. As a consequence the power level at which it is not necessary to employ pattern control may vary considerably. For example, if no velocity limiters are used on the control rods, it may be desirable to use pattern control up to 100% of rated power in order to assure minimum rod worth. However, if velocity limiters are used it may then be desirable to employ pattern control only to approximately 10% of rated power. This is because the peak energy density of the fuel is a function of both the rod worth and the potential velocity of the control rods.

The second of these conditions is a function of the reactivity state of the fuel in the reactor core. This condition occurs, for example, when the fuel has received high exposure and therefore has a low value of reactivity and a corresponding low rod worth. Another example is when the reactor is being operated at a high steam void content but the fuel has received relatively low exposure. In this situation, the steam voids reduce the core reactivity and therefore make it unnecessary to employ pattern control. In each of these examples the measure of the particular condition may be made by the number of control rods that have been withdrawn. That is, after about 75% of the control rods have been withdrawn it is then unnecessary to use pattern control since the reactivity and resultant rod worth are low. In the first of these examples there may be a low power level but a 75% withdrawal would indicate high exposure and a corresponding low reactivity. Conversely, in the second of these examples, with a low exposure core, a 75% rod withdrawal would indicate a high steam void content and corresponding low reactivity.

It is to be understood that the present invention is not to be limited to any particular mechanism for operating the control rods in the manner heretofore described. No specific mechanical or electrical system for withdrawing or inserting or blocking or controlling the rods have been described since these mechanisms are well known to those skilled in the art. Moreover, it is to be understood that the present invention may be practiced by manual selection of control rods by the reactor operator in accordance with the above described procedures, by automatic selection with a digital machine programmed in accordance with the above described procedures, or by a programmed digital or other memory type machine that prohibits movement of rods that are manually selected but deviate from the above described procedures.

As previously indicated, the above described groups may be further subdivided such that Group 1, for example, may be subdivided into two subgroups where the first subgroup would involve withdrawing the peripheral control rods of Group 1 and the second subgroup would then involve withdrawing the remaining center control rods of Group 1. The general rule is that all of the control rods in a group, regardless of the number of subgroups formed, be withdrawn prior to proceeding to the next group. Nevertheless, it is also to be understood that there may be situations, although seldom encountered, in which it may be desirable to deviate from this general rule and deliberately leave or insert, one or several of the control rods, in a manner that does not conform to the described sequences. For example, for reasons of experiments, or instrumentation measurement, or unusual characteristics of fuel bundles or control rods or malfunction of the control rod drive mechanism or the like, it may be desirable to leave two, for example, of the Group 1 control rods inserted and the proceed to withdrawing the Group 2 control rods.

The particular embodiments of this invention have been described and it should be understood that various other modifications and advantages may be made by those skilled in this particular art without departing from the spirit and scope of this invention as set forth in the following claims:

We claim:

1. A method of operating a nuclear reactor having a plurality of fissionable material-bearing fuel elements arranged in a lattice as a core, a plurality of control rods reciprocably disposed in said core including a plurality of 3 x 3 arrays of control rods where each 3 x 3 array consists of three rows of three control rods each having, a center control rod, four corner control rods and four side control rods, said control rods having a plurality of fuel elements associated therewith, said control rods providing a first network of said 3 x 3 arrays such that the control rod in each of the four corners of each array is common with the control rod in the corner position of an adjacent 3 x 3 array, and a second network of 3 x 3 arrays such that adjacent pairs of control rods in the corner positions of each array of said second network are common with adjacent pairs of control rods in the corner positions of adjacent arrays of said first network: comprising the sequential steps of (1) actuating substantially all of the center control rods of the 3 x 3 arrays of said first network, (2) actuating substantially all of the center control rods of the 3 x 3 arrays of said second network, (3) actuating two of the corner rods along one of the diagonals of substantially all of the 3 x 3 arrays of one of said networks, and (4) actuating the remaining two corner rods along the other diagonal of substantially all of the 3 x 3 arrays of said one of said networks.

2. The method of claim 1 whereby the actuated control rods are fully withdrawn and the remaining control rods form a substantially checkerboard pattern of control rods at least partially inserted in said core.

3. The method of claim 2 including the further steps of periodically swapping the control rods inserted in said core between said remaining control rods and said actuated control rods.

4. The method of claim 1 wherein one of the 3 x 3 arrays of said first network includes the center control rod of the reactor core at the center of the 3 x 3 array.

5. The method of claim 1 wherein one of the 3 x 3 arrays of said first network includes the center control rod of the reactor core at one of the corners of the 3 x 3 array.

6. The method of claim 1 wherein one of the 3 x 3 arrays of said first network includes the center control rod of the reactor core at one of the four side positions of the 3 x 3 array.

References Cited

FOREIGN PATENTS

| | | |
|---|---|---|
| 845,207 | 8/1960 | Great Britain. |
| 848,521 | 9/1960 | Great Britain. |

OTHER REFERENCES

Power Reactor Technology, vol. 7, No. 4, 1964, pp. 330–332.

CARL D. QUARFORTH, *Primary Examiner.*

L. DEWAYNE RUTLEDGE, BENJAMIN R. PADGETT, *Examiners.*

H. E. BEHREND, *Assistant Examiner.*